Patented May 13, 1947

2,420,308

UNITED STATES PATENT OFFICE 2,420,308

GEL-FORMING ALGIN COMPOSITION AND METHOD

John I. Gates, Pasadena, Calif., assignor to Kelco Company, San Diego, Calif., a corporation of Delaware No Drawing. Application July 27, 1942, Serial No. 452,561

30 Claims. (Cl. 252—316)

This invention is a novel gel-forming algin composition and method of making same involving the use of finely ground calcium alginate, with or without the addition of finely ground alginic acid, which is dry mixed with a water soluble alginate and added to water, or is added either as such or as a water slurry of finely ground calcium alginate, alone or mixed with powdered alginic acid, to an alginate water solution, to form a clear, transparent gel adapted for use in many applications where gels are required, one such use being to replace and to function similarly to agar in the making of bakery icings, my novel alginate gel imparting the desired body to said icings while also preventing same from sticking to wrappers or the like with which same may contact.

Heretofore, alginates have been used to produce a gel by the addition of calcium citrate to a dilute alginate solution. Thus gels have been formed by dissolving 2 parts of "Kelgin" (an alginate product marketed by Kelco Company, San Diego, California) in 90 parts of water to which a preservative has been added, then forming a slurry of 0.3 part of calcium citrate in 8 parts of water (preferably distilled) and then thoroughly mixing the slurry with the "Kelgin" solution, and letting the mixture stand for from one to two hours, whereupon the thickening would be completed.

Also heretofore, attempts have been made to produce an algin product for use in bakery icings to give them body and prevent sticking to the wrapping paper, the algin being ammonium alginate made in general accordance with U. S. Patents No. 1,814,981 dated July 14, 1931; No. 2,036,922 dated April 7, 1936; and No. 2,036,934 dated April 7, 1936. However, instead of washing the calcium alginate fiber, from which the ammonium alginate was formed, with hydrochloric acid solutions until free from calcium salts to completely convert the calcium alginate into alginic acid, some calcium was left in the fiber probably largely in the form of calcium alginate with a minor calcium portion also present as occulated calcium chloride. Sufficient calcium was therefore present to give the finished ammonium alginate an ash of approximately 4.0–4.6. While this product gave a very viscous 1% by weight water solution having a Woolwich viscosity of about 250–320 seconds, no gel structure was present and the solution showed no tendency to set-up or become rigid.

I will explain the invention to enable others familiar with the art to adopt and use the same, and will summarize in the claims the essential features thereof for which protection is desired.

I have found that an algin composition may be produced which would form a gel when dissolved in water, my product consisting of a dry mixture of a soluble algin salt, such as ammonium or sodium alginate, with calcium alginate, each being manufactured separately to give the final product.

The ammonium alginate portion used in my product is prepared by taking alginic acid made in general accordance with U. S. Letters Patents No. 1,814,981 dated July 14, 1931, or No. 2,036-922 dated April 7, 1936, which acid has less than 3% by weight ash content, and incorporating such alginic acid with 30% (of its dry weight) of 26° Bé. ammonium hydroxide. The resultant paste is dried to about 87–94% solids and ground through about 80 Tyler mesh. A 1% Woolwich viscosity of this ammonium alginate varies between 30 to 80 seconds.

The calcium alginate portion used in my product is manufactured by taking the calcium alginate fiber made in accordance with U. S. Letters Patents No. 1,814,981 dated July 14, 1931, and No. 2,036,922 dated April 7, 1936, just before it is ready to be converted into alginic acid and drying same to about 80–90% solids and grinding the dried product through about 80 Tyler mesh. Such calcium alginate has an ash content of 13–17%.

The final product is made by dry mixing preferably 25–35% by weight of the calcium alginate with preferably 75–65% of the ammonium alginate. The product has an ash of about 5.5–8.0% which is largely calcium oxide. It is not possible to obtain viscosity readings by the Woolwich method due to the gel structure present in a 1% solution. Hence, I used a ¼" steel ball, in place of the 1/16" one used in the Woolwich method, and found that the time for the ¼" ball to fall 15 cm. through a 1% water solution of the product contained in a tube having a 1⅜" inside diameter was about 15–20 seconds. The pH of the 1% solution was the range of 6.8–7.8.

The following test was used to determine the gel strength, the effect of setting time on gel strength, the effect of alginate concentration on gel strength, and the relative amounts of calcium alginate and ammonium alginate needed for maximum gel strength. Since the test is purely empirical, the results thereof are of interest only insofar as their relative values are concerned. In said test the material was dry mixed with five times its weight of sugar, to facilitate dispersion, and then added to water under high speed agitation. Agitation was continued for ten minutes and the resultant dispersion was poured into a round, flat-bottomed dish. The temperature of the test material was maintained at 20° C.

A metal paddle was suspended in the center of the dish by a torsion wire so that it was held above the bottom of the dish but was also held under the surface of the gel. The dish was supported in a holder which fixed its position in relation to the suspended paddle but allowed the dish to be freely rotated. In all tests the apparatus was set up so that the position of the paddle in relation to the dish was the same. The length of the torsion wire attached to the paddle was definitely fixed so that the torque exerted by the paddle for a given amount of rotation was always the same. The dish was provided with a graduated scale to be used in measuring the amount of its rotation. The paddle had a pointer attached which rotated about a graduated scale on the base of the apparatus. It was, therefore, possible to measure the amount of rotation of the dish, and also that of the paddle around the base, which base remained stationary.

When the gel was tested, the dish was rotated at a uniform rate of one division (1 cm.) per 20-second interval. The maximum rotation of the paddle before the gel broke was taken as the gel strength.

Effect of setting time on gel strength of alginate gels

1% gels were made using a dry mixture of 0.65% ammonium alginate and 0.35% calcium alginate. Gel strength tests were carried out allowing different periods of time to elapse between the end of the stirring period and the start of the gel strength test with results as follows:

| Elapsed time, minutes | 7 | 10 | 15 | 20 | 40 |
|---|---|---|---|---|---|
| Maximum paddle rotation, divisions | 3.5 | 7.2 | 13.0 | 14.0 | 14.4 |

The above tests showed that the gel strength, as measured by the maximum rotation off the paddle, increased as the setting time was increased. However, the increase in gel strength between the 20-minute setting time and the 40-minute setting time was very small showing that the gel attained approximately its maximum strength in about 20 minutes. Thus the gel required only a relatively few minutes time to set up and attain its maximum strength.

Effect of alginate concentration on gel strength

Tests were made with 0.875%, 1% and 1.25% dispersions of a dry mixture of 35% calcium alginate and 65% ammonium alginate using a setting time of 20 minutes with results as follows:

| Algin concentration, percent | 0.875 | 1.0 | 1.25 |
|---|---|---|---|
| Maximum paddle rotation, divisions | 3.5 | 7.2 | 9.3 |

The above tests show that increasing the algin concentration increases the gel strength.

Relative amounts of calcium alginate and ammonium alginate needed in dry mixture to produce maximum jelly strength in a 1% gel 1% dispersions of mixtures varying from 90% ammonium alginate and 10% calcium alginate, to 40% ammonium alginate and 60% calcium alginate, were used with a setting time of 20 minutes. The results were as follows:

| Calcium alginate, percent | 10 | 20 | 25 | 30 | 35 | 40 | 50 |
|---|---|---|---|---|---|---|---|
| Ammonium alginate, percent | 90 | 80 | 75 | 70 | 65 | 60 | 50 |
| Maximum paddle rotation, divisions | 0.8 | 11 | 18 | 22 | 16 | 14.3 | 12 |

The above tests showed that the maximum gel strength was formed when a mixture of 70% ammonium alginate and 30% calcium alginate was used. These results confirm the statement above made that the preferred composition of the mixture is in the range 25–35% calcium alginate and 75–65% ammonium alginate.

Ammonium alginate is merely one of the water soluble alginates which may be used, and I do not wish to be limited thereto, since other water soluble alginates, such as sodium alginate, can be used in place of ammonium alginate.

It is also possible to produce an algin gel by either adding a water slurry of finely ground calcium alginate to a water soluble alginate solution, or sifting the calcium alginate into the water soluble alginate solution undergoing high speed agitation. This procedure has been found to give a slightly firmer gel than the addition of the two components dry mixed together, and the addition of the calcium alginate separately allows more latitude and flexibility in regulation of the gel strength.

It is also possible to use some alginic acid powder with the calcium alginate powder. This permits regulation of the pH of the resultant gel, and the use of appreciable amounts of alginic acid results in the formation of a mixed calcium alginate—alginic acid gel.

The calcium alginate portion used in my composition and manufactured in accordance with U. S. Letters Patents No. 1,814,981 dated July 14, 1931, and No. 2,036,922 dated April 7, 1936, as above described, contains some of the soluble calcium salt used to precipitate the calcium alginate. Thus, in commercial preparation of calcium alginate by mixing a solution of sodium alginate and a solution of calcium chloride, some of the calcium chloride is occluded within the colloidal calcium alginate particles and remains therein after the material is dried and ground. The amount of calcium chloride remaining in the calcium alginate can be regulated by the extent to which the calcium alginate is washed before drying and grinding. However, it is extremely difficult and commercially impractical to remove all traces of the occluded calcium chloride. Thus it should be understood that the term calcium alginate when used herein includes the traces of calcium chloride associated with it.

This occluded calcium chloride undoubtedly plays an important part in the gel formation described in my invention. Thus, when the calcium alginate is dispersed in water in the presence of the water soluble alginate such as sodium alginate, the occluded calcium ions from the calcium chloride diffuse slowly out of the calcium alginate particle as it becomes wet and swells, thus making available calcium ions which combine with the sodium alginate to form the calcium alginate gel. This slow diffusion of calcium ions is in addition to the calcium ions that may diffuse from the calcium alginate itself. The nature and behavior of colloidal compounds such as calcium alginate are not fully understood, but it is not unreasonable to believe that some of the calcium ions in combination with the alginate are loosely bound and thus in the presence of water diffuse into solution and contribute their part to the gelling of the sodium alginate.

It is obvious that calcium alginate prepared by methods other than those mentioned herein will also function satisfactorily in my gel-forming composition. Thus, calcium alginate particles prepared by immersing finely ground sodium alginate particles in calcium chloride solution until converted more or less completely to calcium alginate, removing, washing and drying them, will perform equally well in furnishing the necessary calcium ions.

Very few calcium salts possess the necessary solubility characteristics for use in the formation of calcium alginate gels. It is essential that the calcium ions become available at a slow rate and in small quantities. Thus, very soluble calcium salts such as calcium chloride, etc., when mixed directly with an alginate solution precipitate the alginate immediately, or if admixed with a water soluble alginate and the mixture added to water, the calcium ions prevent solution of the alginate by forming an insoluble calcium film around the soluble alginate particles. Less soluble salts such as calcium sulfate usually require buffering by some strong calcium-precipitating salt such as trisodium phosphate to permit solution of the alginate before the calcium reacts with it. Salts such as calcium citrate will slowly form a gel only after hours have elapsed and then only in the presence of relatively large amounts of the calcium salt.

The use of calcium alginate containing an occluded soluble salt of calcium is unique in that it furnishes a minimum of anions other than alginate. Thus, the alginate portion of the calcium alginate contributes to the gel while the anion associated with the occluded soluble calcium salt is present only in a small quantity since only small amounts of the soluble calcium salt are required due to its high solubility. My invention is also unique in permitting the use of a very soluble calcium salt which if added directly to a soluble alginate would precipitate it completely from solution without formation of a gel. Furthermore, another unique feature of my invention is that by washing the calcium alginate to varying degrees it is possible to regulate the time required for the gel to form. Thus, a practically pure calcium alginate would require considerable time for a gel to form while one containing a relatively high percentage of occluded soluble calcium would cause gel formation in a matter of minutes.

I do not wish to be restricted to calcium alginate as the medium for supplying the necessary cations to gel the soluble alginate. It is well known in the prior algin art that the only metallic elements which form water soluble alginates are the alkali metals and magnesium. The alginates of the other metallic elements are considered insoluble. Thus, the cations of these other metals such as calcium, strontium, barium, copper, zinc, cadmium, mercury, aluminum, tin, lead, manganese, iron, cobalt, nickel, etc., when mixed with a solution of a soluble alginate precipitate the corresponding metallic alginate. Thus, the addition of barium chloride precipitates barium alginate, zinc chloride precipitates zinc alginate, etc. Therefore, these metallic alginates made along general lines described herein for calcium alginate and containing small amounts of the corresponding soluble metallic salt used to precipitate the respective alginate, can be used in place of calcium alginate to form a gel with a water soluble alginate in accordance with my invention. Although I have not tried all of the metallic elements in the periodic table, there is every reason to believe that all those whose cations react with a soluble alginate to form an insoluble alginate will function satisfactorily in this invention.

If it is desired to provide control of the rate of gel formation beyond that given by the slow diffusion of the gel-forming cations from the insoluble alginate particles, an additional ingredient can be added to my gel-forming composition. Such ingredient is a water soluble salt of an acid whose anions form an insoluble or very sparingly soluble salt with the cations released from the insoluble alginate. The cation in combination with such anion may be any that does not cause precipitation of the alginate although I prefer cations of the alkali metals. Examples of such water soluble salts are trisodium phosphate, sodium oxalate and sodium carbonate which are suitable for use when calcium alginate is the insoluble alginate used in the composition. The addition of small amounts of such salts delays the formation of the gel to a degree depending upon the quantity added.

I have also found it possible to delay the gel formation by using in place of the water soluble alginates such as ammonium alginate, sodium alginate, potassium alginate, etc. in my gel-forming composition, the phospho-alginates and other alginates described in U. S. Letters Patent No. 2,097,228 dated October 26, 1937. The sodium phospho-alginate made in accordance with this patent is sold under the trade name Dariloid. When used in milk products, the phosphate present in this product renders the sodium alginate, which is normally insoluble in milk, milk soluble. It is generally accepted that the phosphate accomplishes this by buffering off the calcium ions present in the milk by combining with them to form insoluble calcium phosphate, thus preventing the calcium ions from forming an insoluble film of calcium alginate around the particles of alginate. The alginate particles being thus protected have time to dissolve before the calcium reacts with them. After the phosphate has been removed by the calcium, the remaining calcium ions react with the now dissolved and thoroughly distributed alginate to form a semi-gel structure which contributes materially to the stabilization of the milk product.

When such a phospho-alginate is used in my gel-forming composition in place of the water soluble alginate such as ammonium alginate, etc., it behaves analogously, and phosphate combining with the calcium from the calcium alginate until the phosphate is all used up, after which the calcium reacts with the dissolved alginate to form a gel. This in effect causes a delay in gel formation which is advantageous in certain applications.

These phospho-alginates and similar alginates, as is the case when used in milk products, accomplish the buffering off of the calcium or other algin-precipitating cations with the use of much less phosphate or similar salt than would be required if the phosphate were merely dry mixed with the alginate and not actually incorporated with the algin in the wet state during its manufacture. I believe this to be due in a large part to the intimate contact obtained between the alginate and the phosphate by incorporation in the wet state as compared with the rather poor contact produced by dry mixing. When the phosphate is so incorporated the alginate exerts a protective effect on it and prevents it from reacting prematurely under conditions of high humidity, etc., with the calcium or other such cations present in my gel-forming composition.

My gel-forming composition as described herein can be used in many applications where a gel is required and often functions as an agar substitute. It is obvious that by varying the concentration of the various ingredients, bearing in mind their function as disclosed herein, wide variations in the gel strength and the rate of gel formation can be accomplished to suit the specific needs. One specific use of my product is its replacement of agar in bakery icings to give them body and prevent the icings from sticking to their wrappers.

I claim:
1. An algin composition adapted to form a gel when added to water, comprising finely ground calcium alginate, and a finely ground water soluble alginate sufficient to produce a gel of desired strength.
2. In a composition as set forth in claim 1, said water soluble alginate comprising ammonium alginate.
3. In a composition as set forth in claim 1, said water soluble alginate comprising sodium alginate.
4. In a composition as set forth in claim 1, said composition including a small amount of finely ground alginic acid sufficient to adjust the pH to a lower value.
5. An algin composition adapted to form a gel when added to water, comprising 25–35% by weight of finely ground calcium alginate, and 75–65% by weight of a finely ground water soluble alginate.
6. In a composition as set forth in claim 5, said composition having a calcium ash content range of 5.5–8.0% expressed as calcium oxide.
7. In a composition as set forth in claim 5, the pH of a 1% solution of said composition ranging between 6.8–7.8.
8. In a composition as set forth in claim 5, said calcium alginate having an ash content range of 13–17%.
9. In a composition as set forth in claim 5, said water soluble alginate comprising ammonium alginate.
10. In a composition as set forth in claim 5, said water soluble alginate comprising sodium alginate.
11. In a composition as set forth in claim 5, said composition including a small amount of finely ground alginic acid sufficient to adjust the pH to a lower value.
12. A gel consisting of the products of interaction of a mixture of finely ground calcium alginate in a water solution of a finely ground water soluble alginate.
13. In a gel as set forth in claim 12, said water soluble alginate comprising ammonium alginate.
14. In a gel as set forth in claim 12, said water soluble alginate comprising sodium alginate.
15. In a gel as set forth in claim 12, said calcium alginate including a small amount of finely ground alginic acid sufficient to adjust the pH to a lower value.
16. The method of producing a gel, comprising the steps of preparing a finely ground calcium alginate; separately preparing a finely ground water soluble alginate; and mixing the same together in water; said calcium alginate being prepared in the form of a water slurry added to the water solution of the water soluble alginate.
17. The method of producing a gel, comprising the steps of preparing a finely ground calcium alginate; separately preparing a finely ground water soluble alginate; and mixing the same together in water; said calcium alginate being sifted into the water solution of the water soluble alginate.
18. A dry mix algin gel-forming composition comprising 50–80% of a water soluble alginate and 50–20% of a water insoluble alginate.
19. An algin gel-forming composition comprising a water soluble alginate and a substantially water insoluble alginate containing an occluded salt whose cations in the presence of water will gel the soluble alginate.
20. An algin gel-forming composition comprising a water soluble alginate and a substantially water insoluble metallic alginate containing the occluded soluble metallic salt used to precipitate said insoluble alginate.
21. An algin gel-forming composition comprising a water soluble alginate, a substantially insoluble metallic alginate containing the occluded soluble metallic salt used to precipitate said insoluble alginate, and a water soluble salt of an acid whose anions form a substantially insoluble salt with the cations of the occluded metallic salt contained in the insoluble metallic alginate.
22. An algin gel-forming composition comprising a water soluble "phospho-alginate" and a substantially water insoluble alginate containing an occluded salt whose cations in the presence of water will gel the soluble "phospho-alginate."
23. An algin gel-forming composition comprising a water soluble "phospho-alginate" and a substantially water insoluble alginate containing the occluded soluble salt used to precipitate said insoluble alginate.
24. A process of preparing alginate jellies from alkaline earth alginates, wherein an aqueous solution is made containing an alkali metal alginate, and thereafter the alkaline earth alginate is dispersed in the solution in quantity sufficient to form a jelly, and the mixture thus produced is allowed to stand until gelled.
25. In a method as set forth in claim 24, said calcium alginate being prepared in the form of a water slurry added to the water solution of the water soluble alginate.
26. In a method as set forth in claim 24, said calcium alginate being sifted into the water solution of the water soluble alginate.
27. A method of producing a gel comprising the steps of mixing together finely ground calcium alginate and a finely ground water soluble alginate and adding this mixture to water.
28. A method of producing a gel comprising the steps of simultaneously and separately adding finely ground calcium alginate and a finely ground water soluble alginate to water.
29. In a method as set forth in claim 28, said calcium alginate being prepared in the form of a water slurry.
30. A gel consisting of the reaction products in water of a mixture consisting of 25–35% by weight of calcium alginate, 75–65% by weight of a water soluble alginate, and a small amount of alginic acid to regulate the pH of the resultant gel.

JOHN I. GATES.

REFERENCES CITED

The following references are of record in the file of this patent:

UNITED STATES PATENTS

| Number | Name | Date |
|---|---|---|
| 2,097,228 | Lucas | Oct. 26, 1937 |
| 2,036,934 | Green | Apr. 7, 1936 |
| 2,097,230 | Lucas | Oct. 26, 1937 |
| 1,162,926 | Ingham | Dec. 7, 1915 |
| 2,249,694 | Wilding | July 15, 1941 |
| 2,325,051 | Gross I | July 27, 1943 |
| 2,345,255 | Gross II | Mar. 28, 1944 |